United States Patent Office 3,494,936
Patented Feb. 10, 1970

3,494,936
BENZENESULFONYL-UREAS WITH
HYPOGLYCEMIC ACTIVITY
Rudi Weyer, Frankfurt am Main, Walter Aumüller, Kelkheim, Taunus, Helmut Weber, Frankfurt am Main, Karl Muth, Kelkheim, Taunus, and Ruth Heerdt, Mannheim, Germany, assignors to Farbwerke Hoechst Aktiengesellschaft vormals Meister Lucius & Brüning, Frankfurt am Main, Germany, a corporation of Germany
No Drawing. Continuation-in-part of application Ser. No. 474,174, July 22, 1965. This application June 3, 1968, Ser. No. 733,759
Claims priority, application Germany, Aug. 1, 1964, F 43,640; Aug. 14, 1964, F 43,750
Int. Cl. C07d 63/10, 5/16; C07c 127/16
U.S. Cl. 260—332.2
15 Claims

ABSTRACT OF THE DISCLOSURE

Benzenesulfonyl-ureas with hypoglycemic activity having the general formula

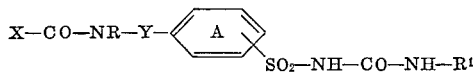

in which
R is hydrogen, lower alkyl or phenyl-lower alkyl, $R^1$ is:
(a) alkyl, alkenyl or mercaptoalkyl having 2 to 8 carbon atoms,
(b) akoxyalkyl or alkylmercaptoalkyl having 4 to 8 carbon atoms of which at least 2 belong to the alkylene part of the alkoxyalkyl or alkylmercaptoalkyl,
(c) phenyl-lower alkyl,
(d) cycloalkyl-lower alkyl having 7 to 9 carbon atoms of which 6 to 8 belong to the cycloalkyl part,
(e) endoalkylene-cyclohexyl, endoalkylene-cyclohexenyl, endoalkylene-cyclohexylmethyl or endoakylene-cyclohexenylmethyl having 1 to 2 endoalkylene-carbon atoms,
(f) lower alkylcyclohexyl, lower alkoxycyclohexyl,
(g) cycloalkyl having 5 to 8 carbon atoms,
(h) cyclohexenyl, cyclohexenylmethyl),
(i) a heterocyclic ring with 4 to 5 carbon atoms and 1 oxygen atom or 1 sulfur atom as well as up to 2 ethylenic double linkages, or
(k) a heterocyclic ring linked to the nitrogen atom by means of a methylene group and containing 4 to 5 carbon atoms and 1 oxygen atom or 1 sulfur atom as well as up to 2 ethylene double linkages, X is:
(a) thienyl or thienoxy which may contain 1 to 2 substituents selected from the group consisting of halogen, lower alkyl, lower alkoxy, lower alkenoxy, lower alkoxy, lower alkoxy, lower phenalkoxy and aryl and a polymethylene chain of 3 to 4 carbon atoms linked by both ends to the thienyl nucleus,
(b) furyl which may contain 1 to 2 substituents selected from the group consisting of halogen and methyl,
and the thienyl, thienoxy or furyl groups may be linked either directl yor by means of a hydrocarbon chain having 1 to 2 carbon atoms to the adjacent carbonyl group, and
Y is a saturated hydrocarbon chain having 1 to 3 carbon atoms
and salts thereof.

The present application is a continuation-in-part application Ser. No. 474,174 filed July 22, 1965 and now abandoned, and relates to benzenesulfonyl-ureas of the formula and definition set forth in the "abstract." These ureas as such or in the form of their salts, possess blood sugar lowering properties and are distinguished by a strong lowering of the blood sugar level.

It will be understood that the terms "lower alkyl" and "lower alkyl," as used in the abstract and hereinafter are intended to refer to alkyl and alkoxy groups of 1 to 4 carbon atoms in straight or branched chains.

Thus, for example, in the compounds of the invention, as set forth in the abstract, R may represent, for instance, methyl, ethyl, propyl, isopropyl, butyl, isobutyl, tert. butyl, benzyl, α- or β-phenylethyl, α-, β- or γ-phenylpropyl. Compounds in which R stands for methyl or benzyl and, above all, those in which R represents hydrogen, are preferred.

$R^1$ may represent, for instance, ethyl, propyl, isopropyl, butyl, isobutyl, sec. butyl, straight-chain or branched amyl (pentyl), hexyl, heptyl or octyl; the groups with an ethylenic double linkage, such as allyl or crotyl, corresponding to the above-mentioned hydrocarbon groups, furthermore alkyls with 2 to 8 carbon atoms carrying, in addition, a mercapto group, for instance β-mercaptoethyl or higher mercaptoalkyls. $R^1$ may likewise represent, for example, γ-methoxypropyl, δ-methoxy-n-butyl, β-ethoxyethyl, γ-ethoxypropyl, δ-ethoxy-butyl or higher alkyloxyethyls, -propyls or -butyls as well as the corresponding groups in which the oxygen atom is replaced by a sulfur atom. Furthermore, $R^1$ may stand for benzyl, α-phenylethyl, β-phenylethyl, α-, β- or γ-phenylpropyl or phenylbutyls.

Within the scope of the invention there are particularly preferred compounds containing as $R^1$ a cycloaliphatic hydrocarbon atom which may be susbtituted by alkyl or alkoxy or linked to the nitrogen atom by means of alkylene. Said groups comprise, for example, cyclopentyl, cyclohexyl, cycloheptyl, cyclooctyl, methylcyclohexyl, ethylcyclohexyl, propyl-cyclohexyl, isopropyl-cycohexyl and tert. butyl-cyclohexyl, methoxycyclohexyl, ethoxycyclohexyl, propoxy-cyclohexyl and isopropoxy-cyclohexyl. The alkyl or alkoxy groups may be present in 2-, 3- or preferably-in 4-position, in cis- as well as in trans-position. Furthermore, there may be mentioned: cyclohexylmethyl, α- or β-cyclohexylethyl, cyclohexylpropoyls, endomethylene-cyclohexyl (2,2,1-bicycloheptyl), endoethylenecyclohexyl (2,2,2-bicyclooctyl), endomethylene-cyclohexenyl, endoethylene - cyclohexenyl, endomethylene - cyclohexylmethyl, endoethylene-cyclohexylmethyl, endomethylenecyclohexenylmethyl or endoethylene-cyclohexenmethyl.

Finally, there are suitable as $R^1$ heterocyclic rings containing in addition to 4–5 carbon atoms 1 oxygen or sulfur atom and up to 2 double linkages and which may be bound by means of a methylene group to the adjacent nitrogen atom. Examples of said heterocyclic rings are:

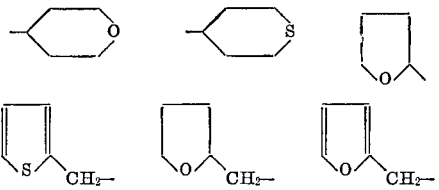

As the member X of the above formula there may be mentioned the following heterocyclic ring systems:

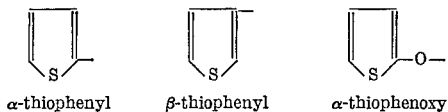

α-thiophenyl β-thiophenyl α-thiophenoxy

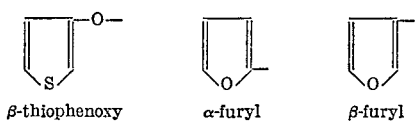

β-thiophenoxy     α-furyl     β-furyl

These ring systems which may contain, in addition, in any position desired one or two equal or different substituents of the type mentioned in column 2, are each linked to the adjacent carbonyl group by means of the free valence given in the above formulae, either directly or by means of a hydrocarbon bridge with 1 to 2 carbon atoms. Said bridges are, for example, —CH$_2$,

—CH(CH$_3$)—

—CH$_2$—CH$_2$— or —CH=CH—.

Examples of the bridge member Y are: —CH$_2$—, —CH$_2$—CH$_2$—, —CH(CH$_3$)—, —CH$_2$—CH$_2$—CH$_2$—, —CH(CH$_3$)—CH$_2$, —CH$_2$—CH(CH$_3$)—, —C(CH$_3$)$_2$—, bridge members Y having 2 to 3 carbon atoms are preferred.

The phenylene group A of the formula may contain the remaining parts of the molecule in ortho-, meta- or para-position to one another, the para-position being preferred. Among the meanings of R of the general formula hydrogen is preferred.

The compounds of the present invention can be manufactured by various methods, such as (a) Reacting benzenesulfonyl-isocyanates, benzenesulfonyl-carbamic acid esters, benzenesulfonyl-thiolcarbamic acid esters, benzenesulfonyl-carbamic acid halides or benzenesulfonyl-ureas carrying the substituent

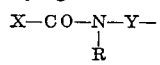

with R$^1$-substituted amines or, if desired, their salts;

(b) Reacting benzenesulfonamides of the formula

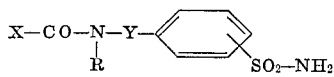

or, if desired, their salts with R$^1$-substituted isocyanates, carbamic acid esters, thiolcarbamic acid esters, carbamic acid halides or ureas;

(c) Reacting correspondingly substituted benzenesulfonylhalides with R$^1$-substituted ureas, isourea-ethers, isothiourea-ethers or parabanic acids and hydrolizing the benzenesulfonyl-isourea-ethers, benzenesulfonyl - isothiourea-ethers or benzenesulfonyl-parabanic acids obtained in this way or by another method;

(d) Replacing the sulfur atom in correspondingly substituted benzenesulfonyl-thioureas in known manner by an oxygen atom;

(e) Oxidizing corresponding benzenesulfinyl-ureas or benzenesulfenyl-ureas; or (f) Introducing the radical X—CO— by acylation into benzenesulfonyl-ureas of the formula

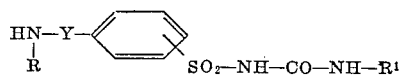

and treating the reaction products with alkaline agents if salt formation is desired.

According to the nature of the member X, the one or the other of the processes mentioned above may in single cases be unsuitable for the preparation of the individual compounds covered by the general formula or may at least require measures for the protection of active groups. Said cases which are comparatively unusual are easily recognized by the expert and it does not cause any difficulties to apply with success another method of synthesis of those described above.

Instead of the benzenesulfonyl-isocyanates there may also be used the products obtained by reaction of benzenesulfonyl-isocyanates with acid amides, such as caprolactam or butyrolactam, moreover those obtained by reaction with weakly basic amines, for instance carbazoles.

The above-mentioned benzenesulfonyl-carbamic acid esters or benzenesulfonyl-thiolcarbamic acid esters may contain in the alcohol component a low-molecular alkyl radical or a phenyl radical. The same applies to the R$^1$-substituted carbamic acid esters or the corresponding monothiocarbamic acid esters. As low-molecular or lower alkyl radical in the sense of the invention is to be understood, in each case, an alkyl radical having at most 4 carbon atoms.

Suitable carbamic acid halides are, in the first place, the chlorides.

The benzenesulfonyl-ureas to be used as starting substances for the process may be unsubstituted at the side of the urea molecule which is opposite to the sulfonyl group or may, preferably, be once or twice substituted by lower alkyl radicals or aryl radicals. Instead of benzenesulfonyl-ureas substituted in said manner there can likewise be used corresponding N-benzenesulfonyl-N'-acyl-ureas (acyl=lower aliphatic acyl such as acetyl, propionyl or butyryl, but also benzoyl) and likewise bis-(benzenesulfonyl)-ureas. It is, for instance, possible to treat said bis-(benzenesulfonyl)ureas or N-benzenesulfonyl-N'-acyl-ureas with amines R$^1$NH$_2$ and to heat the salts obtained to elevated temperatures, particularly above 100° C.

It is likewise possible to start from ureas of the formula R$^1$—NH—CO—NH$_2$ or from acylated ureas of the formula R$^1$—NH—CO—NH-acyl, wherein acyl represents an aliphatic or aromatic acid radical preferably of low molecular weight or from nitro ureas of the formula R'—NH—CO—NH—NO$_2$ or from diphenyl ureas of the formula R$^1$—NH—CO—N(C$_6$H$_5$)$_2$, in which case the phenyl radicals may be substituted and may be linked with one another directly or by means of a bridge member such as —CH$_2$—, NH—, —O— or —S—, or from N,N'-disubstituted ureas of the formula R$^1$—NH—CO—NH—R$^1$ and to react them with benzene-sulfonamides which are substituted by X—CONH—Y—.

In the correspondingly substituted benzenesulfonyl-thio-ureas the sulfur atom can be replaced by an oxygen atom, for example with the aid of oxides or salts of heavy metals or likewise by oxidizing agents such as hydrogen peroxide, sodium peroxide or nitrous acid.

The thio-ureas can likewise be desulfurized by treatment with phosgene or phosphorus pentachloride. Chloroformic acid amidines or chloroformic acid carbodiimides obtained as intermediate products can be converted into benzensulfonyl-ureas by an appropriate treatment, for instance by hydrolysis or addition of water.

As regards the reaction conditions, the forms of realizing the process of the invention, may in general, vary within wide limits and can be adapted to each individual case.

For example, the reactions can be carried out with the use of solvents either at room temperature or at an elevated temperature.

As starting substances there are used, on the one hand, compounds containing a benzene radical which is substituted by the group X—CONR—Y—. As examples of the component X—CO— of said formula there may be mentioned the following—without any claim as to the completeness of the examples given:

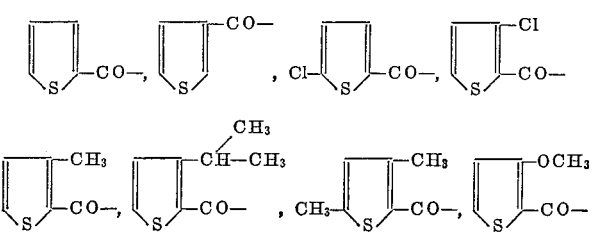

The preparation of the starting materials occurs according to generally known methods. Thus the benzene sulphonamides used as starting substances being substituted by the $$X—CO—NR—Y—$$

group at the benzene nucleus may be obtained e.g. by reacting correspondingly substituted benzene compounds with chlorosulphonic acid and subsequently with amonia or by acylating amino compounds of the formula $$H—NR—Y—\langle\text{phenyl}\rangle—SO_2NH_2$$

with corresponding acid chlorides.

Benzenesulphonyl-carbamic acid esters and-ureas used as starting materials can be obtained e.g. from benzene sulphonamides and chloro-formicic acid esters or kalium cyanate (KOCN), respectively.

The hypoglycemic action of the benzenesulfonyl-urea derivatives described above could be determined by feeding them to rabbits in doses of 10 milligrams/kilogram and determining the blood sugar value according to the known method by Hagedorn-Jensen or by means of an autoanalyzer over a prolonged period of time.

Thus, it was found, for instance, that 10 milligrams/kilogram of N-[4-($\beta$-furoylaminoethyl)-benzenesulfonyl]-N'-cyclohexyl-urea provoke, after 3 hours, a lowering of the blood sugar by 30% and that 10 milligrams/kilogram of N-[4-($\beta$-furoylaminoethyl)-benzenesulfonyl] - N' - (4 - ethylcyclohexyl)-urea even provoke a lowering of the blood sugar by 37%. It was likewise found that 10 milligrams/kilogram of N-[4-($\beta$-thiophene - 2 - carbonamidoethyl)-benzenesulfonyl]-N'-cyclohexyl-urea provoke, after 3 hours, a lowering of the blood sugar by 45%, whereas the known N-(4-methyl-benzenesulfonyl)-N'-butyl-urea administered to rabbits in a dose of less than 25 milligrams/kilogram did not cause any lowering of the blood sugar level.

The strong action of the benzenesulfonyl-ureas described is particularly evident if the dose is further reduced. When administering N - [4 - ($\beta$ - furoylaminoethyl)-benzene-sulfonyl]-N'-(4-ethyl-cyclohexyl)-urea in a dose of 0.2 milligram/kilogram or N-[4-($\beta$-thiophene - 2 - carbonamidoethyl)-benzenesulfonyl]-N'-6'-cyclohexyl-urea in a dose of 1 milligram/kilogram or N-[4-($\beta$-3-methoxy-thiophene-2-carbonamidoethyl) - benzenesulfonyl] - N' - cyclohexylurea in a dose of 0.2 milligram/kilogram or N-[4-($\beta$-3-benzyloxy-thiophene - 2 - carbonamido-ethyl)-benzenesulfonyl]-N'-(4-methyl-cyclohexyl)-urea in a dose of 0.2 milligram/kilogram to rabbits a distinct lowering of the blood sugar can still be observed.

Further test results of the blood sugar lowering action concerning some compounds of the present application are listed in the following table.

TABLE

| Compound | K10, percent | KG, mg./kg. |
|---|---|---|
| N-[4-($\beta$-thiophene-2-carbonamidoethyl)-benzenesulfonyl]-N'-cyclohexyl-urea | 45 | 1 |
| N-[4-($\beta$-furoylaminoethyl)-benzenesulfonyl]-N'-cyclohexyl-urea | 30 | 2 |
| N-[4-($\beta$-furoylaminoethyl)-benzenesulfonyl]-N'-(4-ethylcyclohexyl)-urea | 37 | 0.2 |
| N-[4-($\beta$-furoylaminoethyl)-benzenesulfonyl]-N'-(4-methylcyclohexyl)-urea | 29 | 0.1 |
| N-[4-($\beta$-furoylaminoethyl)-benzenesulfonyl]-N'-(4-isopropylcyclohexyl)-urea | 18 | |
| N-[4-($\beta$-furoylaminopropyl)-benzenesulfonyl]-N'-(4-ethylcyclohexyl)-urea | 29 | 1 |
| N-[4-($\beta$-furfurylidene-acetamidoethyl)-benzenesulfonyl]-N'-butyl-urea | 22 | |
| N-[4-($\beta$-furfurylidene-acetamidoethyl)-benzenesulfonyl]-N'-cyclohexyl-urea | 38 | 1 |
| N-[4-($\beta$-furyl-2-propionamidoethyl)-benzenesulfonyl]-N'-cyclohexyl-urea | 29 | |
| N-[4-(thiophene-2-carbonamido-methyl)-benzenesulfonyl]-N'-(4-ethylcyclohexyl)-urea | 21 | |
| N-[4-($\beta$-<3-methoxy-thiophene-2-carbonamido>-ethyl)-benzenesulfonyl]-N'-(4-methylcyclohexyl)-urea | 37 | 0.08 |
| N-[4-($\beta$-<3-ethoxythiophene-2-carbonamido>-ethyl)-benzenesulfonyl]-N'-(4-methylcyclohexyl)-urea | 20 | 0.05 |
| N-[4-($\beta$-<3,5-dimethylthiophene-2-carbonamido>-ethyl)-benzenesulfonyl]-N'-(4-methylcyclohexyl)-urea | 40 | 0.2 |
| N-[4-($\beta$-<3-methoxythiophene-2-carbonamido>-ethyl)-benzenesulfonyl]-N'-cyclohexylmethyl-urea | 25 | 0.06 |
| N-[4-($\beta$-<3-methoxy-5-chlorothiophene-2-carbonamido>-ethyl)-benzenesulfonyl]-N'-cyclohexyl-urea | 33 | 0.04 |
| N-[4-($\beta$-<3-methoxy-5-chlorothiophene-2-carbonamido>-ethyl)-benzenesulfonyl]-N'-(4-methylcyclohexyl)-urea (trans) | 24 | 0.01 |
| N-[4-($\beta$-<3-methoxy-5-bromothiophene-2-carbonamido>-ethyl)-benzenesulfonyl]-N'-cyclohexyl-urea | 28 | 0.1 |
| N-[4-($\beta$-<3-methoxy-5-bromothiophene-2-carbonamido>-ethyl)-benzenesulfonyl]-N'-(4-methylcyclohexyl)-urea (trans) | 34 | 0.08 |
| N-[4-($\beta$-<3-methoxy-thiophene-2-carbonamido>-ethyl)-benzenesulfonyl]-N'-(2,5-endomethylenecyclohexyl)-urea | 30 | 0.05 |
| N-[4-($\beta$-<3,5-dimethylthiophene-2-carbonamido>-ethyl)-benzenesulfonyl]-N'-(2,5-endomethylenecyclohexyl)-urea | 24 | 0.2 |
| N-[4-($\beta$-<3-ethoxymethoxythiophene-2-carbonamido>-ethyl)-benzenesulfonyl]-N'-cyclohexyl-urea | 23 | 0.2 |
| N-[4-($\beta$-<3-ethoxymethoxythiophene-2-carbonamido>-ethyl)-benzenesulfonyl]-N'-(4-methylcyclohexyl)-urea (trans) | 28 | 0.05 |
| N-[4-($\beta$-<5-chloro-furoylamino>-ethyl)-benzenesulfonyl]-N'-(4-methylcyclohexyl)-urea | 25 | 0.2 |
| N-[4-($\beta$-furoylamino-ethyl)-benzenesulfonyl]-N'-cycloheptyl-urea | 40 | |

See Notes at end of table.

TABLE—Continued

| Compound | K10, percent | KG, mg./kg. |
|---|---|---|
| N-[4-(β-<3-methoxy-thiophene-2-carbonamido>-ethyl)-benzenesulfonyl]-N'-(4-methoxy-cyclohexyl)-urea | 37 | 0.06 |
| N-[4-(β-<3-methoxy-thiophene-2-carbonamido>-ethyl)-benzenesulfonyl]-N'-n-hexyl-urea | 30 | |
| N-[4-(β-<3-methoxy-thiophene-2-carbonamido>-ethyl)-benzenesulfonyl]-N'-(2,5-endomethylene-Δ³-cyclohexenyl-methyl)-urea | 29 | |
| N-[4-(β-<3-methoxy-thiophene-2-carbonamido>-ethyl)-benzenesulfonyl]-N'(Δ³-cyclohexenyl-methyl)-urea | 30 | |

K10 represents the blood sugar lowering effect in percent three hours after having orally administered to rabbits 10 milligrams per kilogram of the listed compounds.

KG represents the minimum dose in milligrams per kilogram which upon administering to rabbits still causes a distinct lowering of the blood sugar level.

The toxicity of the products of the invention is very low and lies in the range of that of the above mentioned N-(4 - methyl - benzenesulfonyl) - N' - n - butyl - urea.

The above described benzenesulfonyl-ureas are preferably destined for the manufacture of orally administrable preparations showing blood sugar lowering action in the treatment of diabetes mellitus and can be applied as such or in the form of their salts or in the presence of substances causing salt formation. For the formation of salts there can be used, for example: alkaline agents, such as alkali metal hydroxides or alkaline earth metal hydroxides, alkali metal carbonates or alkaline earth metal carbonates, alkali metal bicarbonates or alkaline earth metal bicarbonates.

As medical preparations there enter into consideration preferably tablets containing in addition to the products of the invention the usual adjuvants and carriers such as talc, starch, lactose, tragacanth or magnesium stearate.

A preparation containing the above-described benzenesulfonyl-ureas as active substance, for instance a tablet or a powder with or without the above-mentioned additions, is favourably brought into a suitable dosage unit form. The dose chosen should comply with the activity of the benzene-sulfonyl-urea used and the desired effect. The dosage per unit amounts advantageously to about 0.5 to 100 milligrams, preferably to 2–10 milligrams, but considerably higher or lower dosage units can likewise be used which, if desired, are divided or multiplied prior to application.

The following example illustrate the invention but they are not intended to limit it thereto.

EXAMPLE 1

N-[4-(β-thiophene - 2 - carbonamido - ethyl)-benzenesulfonyl]-N'-cyclohexyl-urea 15.5 grams of 4-(β-thiophene-2-carbonamido-ethyl)-benzenesulfonamide (melting point 238° C.; prepared from 4-(β-aminoethyl-benzenesulfonamide and thiophene-2-carboxylic acid chloride) are dissolved in 200 ml. of acetone by adding 2 grams of NaOH and water. 6.5 grams of cyclohexyl-isocyanate are dropped into the solution while stirring at room temperature, stirring is continued for 2 hours, the slightly turbid solution is filtered and the filtrate acidified with hydrochloric acid. The precipitated reaction product is reprecipitated from ammonia of 1% strength and recrystallized from ethanol/water. The N-[4-(β-thiophene-2-carbonamidoethyl) - benzenesulfonyl]-N'-cyclohexyl-urea obtained melts at 194–196° C.

In analogous manner there are obtained: N-[4-(β-thiophene-2-carbonamido - ethyl)-benzenesulfonyl]-N'-butyl-urea (melting point: 213–215° C.); N-[4-(β-thiophene-2-carbonamido-ethyl) - benzenesulfonyl] - N' - (4-ethyl-cyclohexyl)-urea (melting point: 192–194° C.); N-[4-(β-thiophene-2-carbonamido-ethyl)-benzenesulfonyl - N'-(4-methyl-cyclohexyl) - urea (melting point: 181–183° C.); N-[4-(β-thiophene-2-carbonamidoethyl) - benzenesulfonyl[-N'-(Δ³-cyclohexenyl)-urea (melting point: 181–183° C.).

In analogous manner there are obtained from 4-(thiophene-2-carbonamidomethyl)-benzenesulfonamide (melting point: 219–221° C.): N-[4-(thiophene-2-carbonamido-methyl) - benzenesulfonyl - N' - butyl-urea (melting point: 155–157° C.); N-[4-(thiophene-2-carbonamidomethyl)-benzenesulfonyl] - N' - cyclohexyl-urea (melting point: 187–188° C.); N-[4-(thiophene-2-carbonamidomethyl)-benzenesulfonyl] - N' - (4-ethyl-cyclohexyl)-urea (melting point: 196–198° C.).

EXAMPLE 2

N-[4-(β-5-chloro - thiophene-2-carbonamidoethyl) - benzenesulfonyl]-N'-cyclohexyl-urea 17.2 grams of 4-(β-5-chloro-thiophene-2-carbonamidoethyl)-benzenesulfonamide (melting point 280° C.; prepared from 4-(β-aminoethyl)-benzenesulfonamide and 5-chloro-thiophene-2-carboxylic acid chloride) are suspended in 200 ml. of acetone and dissolved by addition of 2 grams of sodium hydroxide and water. 6.5 grams of cyclohexyl-isocyanate are dropped into this solution and the whole is stirred for 2 hours. The slightly turbid solution is filtered with suction, the filtrate combined with water and hydrochloric acid, and the precipitated product recrystallized from ethanol/water. The N-[4-(β-5-chloro-thiophene-2-carbonamido-ethyl) - benzenesulfonyl] - N'-cyclohexyl-urea obtained melts at 189–191° C.

In analogous manner there are obtained: N-[4-(β-5-chloro-thiophene - 2 - carbonamidoethyl) - benzene-sulfonyl]-N'-butyl-urea (melting point: 188–190° C.); N-[4-(β-5-chloro-thiophene-2-carbonamidoethyl) - benzenesulfonyl]-N'-(4-methyl-cyclohexyl) - urea (melting point: 190–192° C.); N-[4-(β - 5 - chloro-thiophene-2-carbonamidoethyl)-benzenesulfonyl]-N'-(4-ethyl - cyclohexyl)-urea (melting point: 191–195° C.); N-[4-(β-5-chlorothiophene-2-carbonamidoethyl) - benzenesulfonyl] - N'-(Δ³-cyclohexenyl)-urea (melting point 186–188° C.).

In analogous manner there is obtained from 4-(β-<3,5-dimethylthiophene-2-carbonamido> - ethyl) - benzenesulfonamide, melting point: 176–177° C., the N-[4-(β-<3,5-dimethylthiophene-2-carbonamido>-ethyl) - benzenesulfonyl]-N'-(2,5-endomethylenecyclohexyl) - urea, melting point: 193–195° C. (from ethanol); from 4 - (β - <3-methoxy - thiophene-2-carbonamido> - ethyl) - benzenesulfonamide, melting point: 201–203° C., the N-[4-(β-<3-methoxy thiophene - 2 - carbonamido>-ethyl)-benzenesulfonyl]-N'-(2-ethyl-n-hexyl)-urea, melting point: 150–152° C. (from methanol); the N-[4-(β-<3-methoxy-thiophene-2-carbonamido>-ethyl) - benzenesulfonyl]-N'-(4-oxa-cyclohexyl)-urea, melting point: 184–185° C. (from methanol); the N-[4-(β-<3-methoxy - thiophene-2-carbonamido>-ethyl)-benzenesulfonyl] - N' - (β-ethyl-mercapto-ethyl)-urea, melting point: 163–165° C. (from methanol); the N-[4-(β-<3-methoxy-thiophene-2-carbonamido>-ethyl)-benzenesulfonyl]-N'-(Δ³ - cyclohexenyl)-urea, melting point: 179–180° C. (from ethanol/water); and the N-[4-(β-<3-methoxy-thiophene-2-carbonamido>-ethyl)-benzenesulfonyl] - N' - (Δ³-cyclohexenyl-methyl)-urea, melting point: 164–165° C. (from ethanol/water).

EXAMPLE 3

N-[4-(β-3-methoxythiophene-2-carbonamidoethyl)-benzenesulfonyl]-N'-cyclohexyl-urea 10 grams of 4-(β-3-methoxythiophene-2-carbonamido-ethyl)-benzenesulfonamide (melting point: 201–203° C.; from dimethylformamide/water) are dissolved in 15 ml. of 2 N-sodium hydroxide solution and 30 ml. of acetone, and 3.9 grams of cyclohexyl-isocyanate are added dropwise at 0–5° C. The reaction mixture is stirred for 3 hours, diluted with water and filtered, and the filtrate is acidified by means of dilute hydrochloric acid. The N-[4-(β-3-methoxythiophene-2 - carbonamide - ethyl) - benzenesulfonyl]-N'-cyclohexyl-urea which precipitates in the form of crystals is recrystallized form dimethylformamide/water and melts at 193–194° C.

In analogous manner there are obtained: N-[4-(β-3-methoxythiophene - 2 - carbonamidoethyl) - benzenesulfonyl]-N'-butyl-urea (melting point: 173–175° C.) (from methanol); N-[4-(β-3-methoxythiophene-2-carbonamido-ethyl)-benzenesulfonyl]-N'-(4 - methylcyclohexyl) - urea (melting point: 190–192° C.) (from dimethylformamide/water); N-[4-(β-<3-methoxythiophene-2-carbonamido>-ethyl)-benzenesulfonyl]-N'-cyclohexylmethyl-urea, melting point: 169–170° C. (from methanol); and N-[4-(β-<3-methoxythiophene-2-carbonamido>-ethyl) - benzenesulfonyl]-N'-(2,5-endomethylenecyclohexyl)-urea, melting point: 190–191° C. (from methanol).

In analogous manner there are obtained from 4-(β-3-ethoxythiophene - 2 - carbonamido - ethyl) - benzenesulfonamide (melting point: 177° C.); N-[4-(β-3 - ethoxy-thiophene - 2 - carbonamido - ethyl) - benzenesulfonyl]-N'-cyclooctyl-urea (melting point: 158–160° C.) (from dimethylformamide/methanol); N-[4-(β - 3 - ethoxythiophene - 2 - carbonamido - ethyl) - benzenesulfonyl]-N'-cyclohexyl-urea (melting point: 174–175° C.) (from methanol/dimethylformamide); N-[4-(β - 3 - ethoxythiophene - 2 - carbonamido - ethyl) - benzenesulfonyl] - N'-butyl-urea (melting point: 146–147° C.) (from dimethylformamide/water); and N-[4-(β - 3 - ethoxythiophene-2-carbonamido-ethyl)-benzenesulfonyl]-N' - (4 - methylcyclohexyl)-urea (melting point: 174–176° C.) (from dimethylformamide/water).

In analogous manner there are obtained from 4-(β-3,5-dimethylthiophene - 2 - carbonamido - ethyl) - benzenesulfonamide (melting point: 176–177° C.); N-[4-(β-3,5-dimethylthiophene - 2 - carbonamido - ethyl) - benzenesulfonyl]-N'-cyclohexyl-urea (melting point 189–190° C.) (from dimethylformamide/water), and N-[4-(β-3,5-dimethylthiophene - 2 - carbonamido - ethyl) - benzenesulfonyl]-N'-(4-methylcyclohexyl)-urea (melting point: 173–175° C.) (from dimethylformamide/water).

In analogous manner there are obtained from 4-(β-3-methylthiophene-2-carbonamido - ethyl) - benzenesulfonamide (melting point: 198–200° C.); N-[4-(β-3-methylthiophene-2-carbonamido - ethyl) - benzensulfonyl] - N'-cyclooctyl-urea (melting point: 203–205° C.) (from dimethylformamide/water); N-[4-(β-3-methylthiophene - 2 - carbonamido-ethyl) - benzenesulfonyl] - N' - cyclohexyl-urea (melting point: 183–184° C.) (from dimethylformamide/water); N-[4-(β-3-methylthiophene-2 - carbonamido-ethyl)-benzenesulfonyl]-N'-butyl-urea (melting point: 175–177° C.) (from dimethylformamide/water); and N-[4 - (β - 3 - methylthiophene - 2 - carbonamido-ethyl)-benzensulfonyl]-N'-(4-methylcyclohexyl) - urea (trans-form) (melting point: 201–203° C.) (from dimethylformamide/water).

In analogous manner there are obtained from 4-(β-3-chlorothiophene - 2 - carbonamido-ethyl)-benzenesulfonamide (melting point: 211–213° C.); N-[4-(β-3-chlorothiophene - 2 - carbonamido - ethyl) - benzenesulfonyl] - N'-cyclohexyl-urea (melting point: 183–184° C.) (from dimethylformade/water); N-[4-(β-3-chlorothiophene-2-carbonamido-ethyl)-benzenesulfonyl]-N'-butyl - urea (melting point: 189–190° C.) (from methanol); N-[4-(β-3-chlorothiophene - 2 - carbonamido - ethyl) - benzenesulfonyl] - N' - (4 - methyl - cyclohexyl) - urea (transform) (melting point: 207–209° C.) (from dimethylformamide/water); and N-[4-(β - 3 - chlorothiophene - 2 - carbonamido-ethyl)-benzenesulfonyl] - N' - (4 - ethylcyclohexyl)-urea (transform) (melting point: 177–178° C.) (from methanol).

In analogous manner there are obtained:

From 4-(β-<thiophene-2-acetamido>-ethyl)-benzenesulfonamide (melting point: 176–178° C.) the N-[4-(β-<thiophene-2-acetamido>-ethyl)-benzenesulfonyl] - N'-cyclohexyl-urea (melting point: 186° C.) (from dimethylformamide/water) and the N-[4-(β-<thiophene-2-acetamido> - ethyl) - benzenesulfonyl] - N' - (4 - methylcyclohexyl)-urea (trans) (melting point: 173–174° C.) (from methanol/dimethylformamide);

From 4-(β-<3-phenyl-4-methylthiophene-2-carbonamido> - ethyl) - benzenesulfonamide (melting point: 183–185° C.) the N-[4-(β-<3-phenyl - 4 - methylthiophene-2-carbonamido> - ethyl) - benzenesulfonyl] - N' - cyclohexyl-urea (melting point: 150–152° C.) (from methanol) and the N-[4-(β-<3-phenyl-4-methylthiophene-2-carbonamido> - ethyl) - benzenesulfonyl] - N' - (4 - methyl-yl-cyclohexyl)-urea (trans) (melting point: 136–138° C.) (from methanol);

From 4-(3-methylthiophene - 2 - carbonamidomethyl)-benzenesulfonamide (melting point: 153° C.) the N-[4-(3 - methylthiophene - 2 - carbonamidomethyl) - benzenesulfonyl-N'-cyclohexyl-urea (melting point: 163–165° C.) (from methanol) and the N-[4-(3-methylthiophene-2-carbonamidomethyl)-benzenesulfonyl] - N' - (4 - methylcyclohexyl)-urea (trans) (melting point: 190–191° C.) (from methanol);

From 4 - (β<N-methyl-3-methoxythiophene-2-carbonamido>-ethyl)-benzenesulfonamide (melting point: 132–134° C.) the N-[4-(β-<N-methyl-3-methoxythiophene-2-carbonamido>-ethyl)-benzenesulfonyl] - N' - cyclohexyl-urea (melting point: 143–145° C.) (from methanol) and the N-[4-(β-<N-methyl-3-methoxythiophene-2 - carbonamido>-ethyl)-benzenesulfonyl]-N'-(4 - methylcyclohexyl)-urea (trans) (melting point 159–161° C. (from methanol);

From 4 - (β - <3,4 - tetramethylene - thiophene - 2-carbonamido>-ethyl)-benzenesulfonamide (melting point: 173–174° C.) the N - [4 - (β - <3,4 - tetramethylene-thiophene - 2 - carbonamido> - ethyl) - benzenesulfonyl] - N' - cyclohexyl - urea (melting point 192–194° C.) (from dimethylformamide/water) and the N-[4-(β-<3,4-tetramethylene - thiophene - 2 carbonamido> - ethyl)-benzenesulfonyl] - N' - (4 - methylcyclohexyl) - urea (trans) (melting point: 127–129° C.) (from methanol);

From 4 - (3,4 - tetramethylene - thiophene - 2 - carbonamidomethyl) - benzenesulfonamide (melting point; 174–175° C.) the N - [4 - (3,4 - tetramethylene - thiophene - 2 - carbonamido - methyl) - benzenesulfonyl]-N' - (4 - methylcyclohexyl) - urea (trans) (melting point; 192–193° C.) (from methanol);

From 4 - (β - <thiophene - 3 - oxyacetamido> - ethyl)-benzene - sulfonamide (melting point: 203° C.) the N-[4 - (β - <thiophene - 3 - oxyacetamido> - ethyl) - benzene - sulfonyl] - N' - cyclohexyl - urea (melting point: 148–149° C.) (from methanol), the N - [4 - (β - <thiophene - 3 - oxyacetamido> - ethyl) - benzenesulfonyl] N' - (4 - methylcyclohexyl) - urea (trans) (melting point: 182–183° C.) (from methanol);

From 4 - (β - <3 - methoxymethoxy - thiophene - 2 - carbonamido> - ethyl) - benzenesulfonamide (melting point: 160–162° C.) the N - [4 - (β - <3 - methoxymethoxy - thiophene - 2 - carbonamido> - ethyl) - benzenesulfonyl] - N' - cyclohexyl - urea (melting point: 169–171° C. from methanol) and the N - [4 - (β - <3-methoxymethoxy - thiophene - 2 - carbonamido> - ethyl)-benzenesulfonyl] - N' - (4 - methylcyclohexyl) - urea (trans) (melting point: 163–165° C.) (from methanol);

From 4 - (β - <3 - β - methoxyethoxy - thiophene - 2 - carbonamido> - ethyl) - benzenesulfonamide (melting point: 132–134° C.) the N - [4 - (β - <3 - β - methoxyethoxy - thiophene - 2 - carbonamido> - ethyl) - benzenesulfonyl] - N' - cyclohexyl - urea (melting point: 135–137° C.) (from methanol), the N - [4 - (β - <3-(β-methoxyethoxy - thiophene - 2 - carbonamido> - ethyl)-benzenesulfonyl] - N' - (4 - methylcyclohexyl) - urea (trans) (melting point: 103–105° C.) (from methanol), and the N - [4 - (β - <3 - β - methoxyethoxy - thiophene - 2-carbonamido> - ethyl) - benzenesulfonyl] - N' - 4 - (ethylcyclohexyl) - urea (trans) (melting point: 132–133° C. from methanol);

From 4 - (β - <3 - allyloxythiophene - 2 - carbonamido> - ethyl) - benzenesulfonamide (melting point: 145–147° C.) the N - [4 - (β - <3 - allyloxythiophene-2 - carbonamido> - ethyl) - benzenesulfonyl] - N' - (4-methylcyclohexyl) - urea (trans) (melting point: 135–136° C.) (from methanol) and the N - [4 - (β - <3 - allyloxythiophene - 2 - carbonamido> - ethyl) - benzenesulfonyl] - N' - cyclohexyl - urea (melting point: 132–134° C. from methanol);

From 4 - (β - <3 - ethoxymethoxythiophene - 2 - carbonamido> - ethyl) - benzenesulfonamide (melting point: 187–188° C.) the N - [4 - (β - <3 - ethoxymethoxythiophene - 2 - carbonamido> - ethyl) - benzenesulfonyl] - N' - cyclohexyl - urea (melting point: 144–148° C. from methanol) and the N-[4-(β-<ethoxymethoxythiophene - 2 - carbonamido> - ethyl) - benzenesulfonyl]-N' - (4 - methylcyclohexyl) - urea (trans) (melting point: 145–146° C. from methanol).

In analogous manner there are obtained from 4 - (β-<3 - methoxy - 5 - chlorothiophene - 2 - carbonamido>-ethyl) - benzenesulfonamide (melting point: 200–202° C.) the N - [4 - (β - <3 - methoxy - 5 - chlorothiophene-2 - carbonamido> - ethyl) - benzenesulfonyl] - N' - cyclohexyl - urea (melting point: 179–180° C. from methanol) the N - [4 - (β - <3 - methoxy - 5 - chlorothiophene - 2 - carbonamido> - ethyl) - benzenesulfonyl] - N' - (4-methyl - cyclohexyl) - urea (trans) (melting point: 206–207° C. from methanol) and the N - [4 - (β - <3-methoxy - 5 - chlorothiophene-2-carbonamido> - ethyl)-benzenesulfonyl] - N' - (4 - isopropyl - cyclohexyl)-urea (melting point: 175–176° C. from methanol) and the N-[4 - (β - <3 - methoxy - 5 - chlorothiophene - 2 - carbonamido> - ethyl) - benzenesulfonyl] - N' - (4 - isopropyl-cyclohexyl) - urea (melting point: 171–173° C. from methanol/dimethylformamide);

From 4 - (β - <3 - methoxy - 5 - bromothiophene - 2 - carbonamido>ethyl)-benzenesulfonamide (melting point: 206–208° C.) the N - [4 - (β - <3 - methoxy - 5 - bromothiophene - 2 - carbonamido> - ethyl) - benzenesulfonyl]-N' - cyclohexyl - urea (melting point: 200–202° C. from methanol/dimethylformamide) and the N - [4 - (β - <3-methoxy - 5 - bromothiophene - 2 - carbonamido> - ethyl) - benzenesulfonyl] - N' - (4 - methylcycohexyl)-urea (trans) (melting point: 162–163° C. from methanol);

From 4 - (β - <3 - ethoxy - 5 - chlorothiophene - 2 - carbonamido> - ethyl) - benzenesulfonamide (melting point: 180–181° C.) the N - [4 - (β - <3 - ethoxy - 5 - chlorothiophene - 2 - carbonamido> - ethyl) - benzenesulfonyl] - N' - cyclohexyl - urea (melting point: 194–195° C. from methanol/dimethylformamide), the N - [4-(β - <3 - ethoxy - 5 - chlorothiophene - 2 - carbonamidoethyl) - benzenesulfonyl] - N' - (4 - methylcyclohexyl)-urea (trans) (melting point: 181–183° C. from methanol/dimethylformamide) and the N - [4 - (β - <3 - ethoxy-5 - chlorothiophene - 2 - carbonamido> - ethyl - benzenesulfonyl] - N' - butyl - urea (melting point: 120–122° C. from methanol).

EXAMPLE 4

N-[4-(β-3-benzyloxythiophene-2-carbonamido-ethyl)-benzenesulfonyl]-N'-cyclohexyl-urea A mixture of 11.5 grams of N-[4-(β-3-benzyloxythiophene - 2 - carbonamidoethyl) - benzenesulfonyl] - urea (melting point: 109–110° C.; from dimethylformamide/water), 300 ml. of toluene, 30 ml. of glycolmonomethyl ether, 1.65 grams of glacial acetic acid and 2.8 grams of cyclohexylamine is heated under reflux for 5 hours, while stirring. The mixture is concentrated in vacuo and the residue triturated with methanol. The N-[4-(β-3-benzyloxythiophene - 2 - carbonamido - ethyl) - benzenesulfonyl] - N' - cyclohexyl - urea which is obtained in the form of crystals is filtered with suction and recrystallized from methanol/dimethylformamide. Melting point: 167–168° C.

EXAMPLE 5

N-[4-(β-3-benzyloxythiophene-2-carbonamido-ethyl)-benzenesulfonyl]-N'-(4-methylcyclohexyl)-urea 23.8 grams of N - [4 - (β - 3 - benzyloxythiophene - 2 - carbonamido - ethyl) - benzenesulfonyl] - carbamic acid methyl ester (melting point: 163–164° C.; from alcohol) are suspended in 50 ml. of xylene and 5.8 grams of 4-methylcyclohexylamine are added dropwise at 70° C., while stirring. The temperature is raised to 120–130° C. while the reaction sets in with formation of methanol. The temperature is maintained at 130° C. for 30 minutes, then the whole is allowed to cool, the precipitated crude product is filtered with suction and recrystallized from methanol. The N - [4 - (β - 3 - benzyloxythiophene - 2 - carbonamido - ethyl) - benzenesulfonyl] - N' - (4 - methylcyclohexyl) - urea obtained melts at 153–155° C.

In analogous manner there are obtained:

From the N - [4 - (β-<3-methoxy-thiophene-2-carbonamido>-ethyl)-benzenesulfonyl]-carbamic acid methyl ester (melting point: 225–227° C.) the N-[4-(β-<3-methoxy - thiophene-2-carbonamido>-ethyl)-benzenesulfonyl]-N'-(γ-methoxypropyl) urea, melting point: 155–157° C. (from methanol); the N-[4-(β-<3-methoxythiophene - 2-carbonamido>-ethyl)-benzenesulfonyl]-N'-allyl-urea, melting point: 210–212° C. (from methanol/dimethylformamide); the N-[4-(β-<3-methoxy-thiophene-2-carbonamido> - ethyl)-benzenesulfonyl]-N'-(4-mbethoxy-cyclohexyl)-urea; melting point: 164–166° C. (from methanol); the N-[4-(β-<3-methoxy-thiophene-2-carbonamido> - ethyl)-benzenesulfonyl]-N'-n-hexyl-urea, melting point: 162–164° C. (from methanol); the N-[4-(β - <3-methoxy-thiophene-2-carbonamido>ethyl)-benzenesulfonyl]-N'-(thenyl-2)-urea, melting point: 156–158° C. (from methanol); the N-[4-(β-<3-methoxythiophene - 2 - carbonamido>-ethyl)-benzenesulfonyl]-N' - (2,5 - endomethylene-Δ³-cyclohexenyl-methyl)-urea, melting point: 180.5–182° C. (from methanol).

EXAMPLE 6

N-[4-(β-thiophene-2-carbonamido-ethyl)-benzenesulfonyl]-N'-cyclohexyl-urea 1.35 grams of N - [4-(β-thiophene-2-carbonamidoethyl)-benzenesulfonyl]-N'-cyclohexyl-thiourea (melting point: 181–183° C.; prepared from 4-(β-thiophene-2-carbonamido-ethyl)-benzenesulfonamide and cyclohexylmustard oil) are dissolved in 3 ml. of normal sodium hydroxide solution and 30 ml. of water and the whole is added to a suspension of mercury oxide obtained by dissolution of 0.81 gram of mercury (2) chloride in 15 ml. of water and addition to 3 ml. of 2 N-sodium hydroxide solution. The whole is heated to 40° C., stirred for 5 minutes at this temperature, the mercury sulfide precipitated is filtered, the filtrate acidified with dilute hydrochloric acid and the precipitated reaction product filtered with suction. After recrystallization from methanol the N - [4 - (β-thiophene-2-carbonamido-ethyl)-benzenesulfonyl]-N'-cyclohexyl-urea melts at 191–193° C.

EXAMPLE 7

N-[4-(β-thiophene-2-carbonamidoethyl)-benzenesulfonyl]-N'-cyclohexyl-urea 1.2 grams of N-[4-(β-thiophene-2-carbonamidoethyl)-benzenesulfonyl]-N'-cyclohexyl-isourea methylether (in the form of an oil obtained by treating N-[4-(β-thiophene-2-carbonamidoethyl)-benzenesulfonyl]-N'-cyclohexyl-thio-urea with mercury oxide in methanol) are heated for about 10 minutes on the steam bath together with 15 ml. of concentrated hydrochloric acid. The reaction mixture is allowed to cool, diluted with water, and the reaction product filtered with suction. The N-[4-(β-thiophene-2-carbonamidoethyl) - benzene - sulfonyl]-N'-cyclohexyl-urea is recrystallized from methanol and melts at 191–193° C.

In analogous manner there is obtained: from N-[4-(β-<3 - methoxy - thiophene-2-carbonamido>-ethyl)-benzenesulfonyl] - N'-(β-phenyl-ethyl)-isourea-methyl-ether (obtained from the corresponding thiourea, melting point: 156–158° C. with decomposition) the N-[4-(β-<3-methoxy-thiophene - 2 - carbonamido>-ethyl)-benzenesulfonyl]-N'-(β-phenyl-ethyl)-urea, melting point: 181–183° C. (from methanol/water).

EXAMPLE 8

N-[4-(β-furoylaminoethyl)-benezenesulfonyl]-N'-cyclohexyl-urea 14.7 grams of 4-(β-furoylaminoethyl)-benzenesulfonamide (melting point: 228–230° C.); prepared by reaction of 4-(β-aminoethyl)-benzenesulfonamide with pyromucic acid (chloride) are suspended in 200 ml. of acetone and dissolved by addition of 2 grams of sodium hydroxide and water. 6.5 grams of cyclohexyl-isocyanate are dropped into the solution while stirring at room temperature, and stirring is continued for 2 hours. The fine precipitate formed is filtered with suction and the filtrate combined with water and hydrochloric acid. The product is filtered with suction and recrystallized from a mixture of ethanol and water. The N-[4-(β-furoylaminoethyl)-benzenesulfonyl]-N'-cyclohexyl-urea obtained melts at 176–178° C.

In analogous manner are obtained: N-[4-(β-furoylaminoethyl) - benzenesulfonyl] - N'-(4-ethyl-cyclohexyl)-urea, melting at 196–198° C.; N-[4-(β-furoylaminoethyl) - benzenesulfonyl]-N'-butylurea, melting at 201–203° C.; N - [4-(β-furoylaminoethyl)-benzenesulfonyl]-N'-(4-methyl-cyclohexyl)-urea, melting at 184–186° C.; N-[4-(β-furoylaminoethyl)-benzenesulfonyl]-N'-(4-isopropyl-cyclohexyl)-urea, melting at 209–211° C.; N - [4 - (β-furoylaminoethyl)-benzenesulfonyl]-N'-(Δ³-cyclohexenyl)-urea (melting point: 166–168° C.).

In analogous manner there are obtained from 4-(β-furoylaminopropyl) - benzenesulfonamide (melting point: 192–194° C.); N - [4-(β-furoylaminopropyl)-benzenesulfonyl]-N'-cyclohexyl-urea, melting at 196–198° C.; N-[4 - (β-furoylaminopropyl)-benzenesulfonyl]-N'-(4-ethyl-cyclohexyl)-urea, melting at 179–181° C.

EXAMPLE 9

N - (4 - furoylaminoethyl - benzenesulfonyl) - N'-cyclohexyl-urea 28 grams of 4-furoylaminomethyl-benzenesulfonamide (melting point: 218–219° C.) are suspended in 250 ml. of acetone and dissolved by addition of 4 grams of sodium hydroxide and water. 12.5 grams of cyclohexyl-isocyanate are dropped in while stirring at room temperature, and stirring is contined for 2 hours. The slightly turbid solution is filtered, the filtrate is acidified after addition of water and the reaction product recrystallized from ethanol. The N-(4-furoylamino-methyl-benzenesulfonyl)-N'-cyclohexyl-urea obtained melts at 173–175° C.

In analogous manner there are obtained: N-(4-furoylaminomethyl - benzenesulfonyl)-N'-butyl-urea (melting point: 171–173° C.), and N-(4-furoylaminoethyl-benzenesulfonyl)-N'-(4-isopropyl-cyclohexyl)-urea (melting point: 190–192° C.).

EXAMPLE 10

N-[4-(β-<β-furyl-2-propionamido>-ethyl)-benzenesulfonyl]-N'-6'-cyclohexyl-urea 15 grams of 4-(β-furyl-2-propionamidoethyl)-benzenesulfonamide (melting point: 195–197° C.; prepared from 4-(β-aminoethyl)-benzenesulfonamide and the mixed anhydride of furyl-2-propionic acid and carbonic acid semi-ester) are combined in 200 ml. of acetone with the solution of 1.1 grams of sodium hydroxide solution in water. Water is added while stirring until a solution is formed, 6 grams of cyclohexylisocyanate are dropped in at room temperature and stirring is continued for 2 hours. The reaction mixture is filtered and water and hydrochloric acid are added. The reaction product is filtered with suction and recrystallized from a mixture of ethanol and water. The N-[4-(β-furyl-2-propionamidoethyl)-benzenesulfonyl]-N'-cyclohexyl-urea obtained melts at 170–172° C.

In analogous manner are obtained: N[4-(β-<β-furyl-2-propionamido>-ethyl) - benzenesulfonyl] - (4 - ethyl-cyclohexyl)-urea (melting point: 141–143° C.), and N-[4-(β<β-furyl - 2 - propionamido> - ethyl) - benzenesulfonyl]-N'butyl-urea (melting point: 132–134° C.).

In analogous manner there are obtained from 4-(β-furfurylidene - acetamidoethyl) - benzenesulfonamide (melting point: 240° C.; prepared from 4-(β-aminoethyl)-benzenesulfonamide and furylacrylic acid chloride): N-[4-(β-furfurylidene-acetamidoethyl) - benzenesulfonyl]-N'-cyclohexyl-urea (melting point: 200° C.), and N-[4-(β - furfurylidene-acetamidoethyl) - benzenesulfonyl]-N'-butyl-urea (melting point: 199° C.).

EXAMPLE 11

N-[4-(5-chloro-furoylaminomethyl)-benzenesulfonyl]-N'-butyl-urea 11 grams of 4-(5-chloro-furoylaminomethyl)-benzenesulfonamide are dissolved in 150 ml. of acetone by addition of 1.4 grams of sodium hydroxide solution and water. 3.5 grams of butyl-isocyanate are dropped in at room temperature and the whole is stirred for 2 hours. The slightly turbid solution is filtered with suction, the filtrate is combined with water and hydrochloric acid and the product filtered with suction. The N-[4-(5-chloro-furoylaminoethyl)-benzenesulfonyl] - N' - butyl-urea obtained is recrystallized from ethanol/water and melts at 161–162° C.

In analogous manner there is obtained: N-[4-(β-<5-chlorofuroylamino> - ethyl) - benzenesulfonyl] - N' - (4-methyl-cyclohexyl)-urea, melting point: 112–114° C. (from ethanol/water).

EXAMPLE 12

N-[4-(β-furoylaminoethyl)-benzenesulfonyl]-N'-cyclohexyl-urea 17.6 grams of N - [4 - (β - furoylaminoethyl)-benzenesulfonyl]-carbamic acid methylester (melting point: 182–184° C.; prepared from 4-(β-furoylaminoethyl)-benzenesulfonamide and chloroformic acid methylester in the presence of potassium carbonate) are suspended in 50 ml. of xylene and 5 grams of cyclohexylamine are dropwise added at about 60–80° C., while stirring. While the temperature is raised to 120–130° C. the reaction sets in with evolution of methanol, and the whole is stirred for about 1 hour at this temperature. After cooling, the precipitated reaction product is filtered with suction and recrystallized from a mixture of ethanol and water. The N-[4-(β-furoylaminoethyl)-benzenesulfonyl] - N' - cyclohexyl-urea obtained melts at 176–178° C.

In analogous manner there are obtained from 4-(β-furoylaminoethyl) - benzenesulfonyl] - N' - cycloheptyl-urea, melting point: 178–180° C.; from water/ethanol and the N-[4-(β-furoylaminoethyl)-benzenesulfonyl]-N'-benzyl-urea, melting point 199–201° C. (from water/ethanol).

EXAMPLE 13

N-[4-(β-furoylaminoethyl)-benzenesulfonyl]-N'-cyclohexyl-urea 8 grams of N-[4-(β-furoylaminoethyl)-benzenefonyl]-urea (melting point 185–187° C.; prepared from 4-(β-furoylaminoethyl) - benzenesulfonamide and potassium carbonate) are heated under reflux for 5 hours, while stirring, in 250 ml. of toluene containing 1.65 grams of glacial acetic acid and 2.9 grams of cyclohexylamine. After cooling the whole is concentrated in vacuo, the residue is treated with some alcohol and water and the reaction product filtered with suction. The N-[4-(β-furoylaminoethyl) - benzenesulfonyl] - N' - cyclohexyl-urea obtained is recrystallized from ethanol/water and melts at 176–178° C.

EXAMPLE 14

N-[4-(β-furoylaminoethyl)-benzenesulfonyl]-N'-isobutyl-urea 13.6 grams of mercury chloride are dissolved in 120 ml. of water and 50 ml. of 2 N-sodium hydroxide solution are added dropwise. To this mixture 16.5 grams of N - [4 - (β - furoylaminoethyl)-benzenesulfonyl]-N'-isobutyl-fluo-urea (melting point: 131–133° C.; prepared from 4 - (β - furoylaminoethyl)-benzenesulfonamide and isobutyl-mustard oil in the presence of potassium carbonate) dissolved in 80 ml. of a mixture of equal parts of normal sodium hydroxide solution and dimethylformamide are added at about 40° C. The whole is stirred for 2½ hours at 40–50° C., the mercury sulfide formed is filtered with suction, the filtrate is clarified by means of charcoal and acidified with dilute hydrochloric acid. The N-[4-(β-furoylaminoethyl) - benzenesulfonyl] - N' - isobutyl-urea is filtered with suction and recrystallized from methanol. Melting point: 192–194° C.

EXAMPLE 15

N-[4-(β-furoylaminoethyl)-benzenesulfonyl]-N'-isobutyl-urea 4 grams of N - [4 - (β - furoylaminoethyl)-benzenesulfonyl]-N'-isobutyl-isourea-methylether (in the form of an oil obtained by reaction of N[4-(β-furoylaminoethyl)-benzenesulfonyl]-N'-isobutyl-thiourea with mercury oxide in methanol) are heated on the steam bath together with 30 ml. of concentrated hydrochloric acid until the formation of gas is terminated (about 10 minutes). The reaction mixture is cooled and diluted with water. The N-[4-(β-furoylaminoethyl) - benzenesulfonyl] - N-isobutyl-urea is filtered with suction, and recrystallized from methanol. Melting point: 192–194° C.

EXAMPLE 16

N-[4-(β-<furyl-2-acetamido>-ethyl)-benzenesulfonyl]-N'-cyclohexyl-urea 5 g. 4-(β-<furyl-2-acetamido>-ethyl)-benzenesulfonamide (melting point: 152–154° C., obtained from furyl-2-acetic acid, 4-(β-aminoethyl)-benzenesulfonamide and dicyclohexylcarbodiimide) are refluxed in 100 cc. acetone with 3.3 g. potassium-carbonate for three hours under stirring. Then 2.3 g. cyclohexylisocyanate are added dropwise and refluxing is continued over eight hours. After this the acetone is removed, the residue is treated with water, filtered and the filtrate is acidified. The precipitated N - [4 - (β - <furyl - 2 - acetamido> - ethyl) - benzenesulfonyl]-N'-cyclohexyl-urea is recrystallized from water/ethanol and melts at 182–183° C.

In analogous manner there is obtained: the N-[4-(β-<furyl - 2 - acetamido> - ethyl) - benzenesulfonyl] - N'-(4-methyl-cyclohexyl)-urea, melting point: 186–188° C. (from water/ethanol) and the N-[4-(β-<furyl-2-aceta- mido> - ethyl) - benzenesulfonyl]-N'-butyl-urea, melting point: 148–150° C. (from water/ethanol).

EXAMPLE 17

N - [4 - (β - <3,4 - tetramethylenethiophene - 2 - carbonamido> - ethyl) - benzenesulfonyl] - N' - (4 - methylcyclohexyl)-urea (trans)

21.2 grams of N-[4-(β-<3,4-tetramethylenethiophene-2 - carbonamido> - ethyl) - benzenesulfonyl] - methylurethane (melting point: 194–196° C.) (from methanol) are suspended in 50 ml. of xylene and 5.8 grams of 4-methylcyclohexylamine are added dropwise at 70° C., while stirring. The temperature is raised to 120–130° C., while the reaction sets in with formation of methanol. The temperature is maintained at 130° C. for 30 minutes, then the whole is allowed to cool, the precipitated crude product is filtered with suction and recrystallized from methanol. The N-[4-(β-<3,4-tetramethylene-thiophene-2-carbonamido> - ethyl) - benzenesulfonyl]-N'-(4-methylcyclohexyl)-urea melts at 127–129° C.

In analogous manner there are obtained: from N-[4-(β - <3 - ethoxy - thiophene - 2 - carbonamido> - ethyl)-benzenesulfonyl]-carbamic acid methyl ester (melting point: 158° C.), N-[4-(β-<3-ethoxy-thiophene-2-carbonamido> - ethyl) - benzenesulfonyl] - N' - cycloheptylmethyl urea (melting point: 158° C.) (from methanol/water) and N-[4-(β-<3-ethoxy - thiophene - 2 - carbonamido>-ethyl)-benzenesulfonyl]-N'-cycloheptylethyl urea (melting point: 151° C.) (from methanol/water).

EXAMPLE 18

N - [4 - (β - <3 - ethoxythiophene - 2 - carbonamido>-ethyl) - benzenesulfonyl] - N' - (2.5 - endomethylenecyclohexyl-methyl)-urea 1(a) 27.4 grams of 4-(β-<3-ethoxythiophene-2-carbonamido>-ethyl)-benzenesulfonamide are dissolved in a mixture of 200 ml. of acetone and 100 ml. of dioxane. 22.1 grams of finely pulverized sodium carbonate are added and heated for 1 and a half hour under reflux to boil while stirring. Then 13.4 grams of 2.5-endomethylene-cyclohexyl-methyl-mustard oil are added and stirring is continued for 6 hours at boiling temperature of the acetone. The whole is poured into 2 l. of water and acidified with hydrochloric acid. The crystallized precipitate obtained from N-[4-(β-<3-ethoxy-thiophene - 2 - carbonamido> - ethyl) - benzenesulfonyl] - N' - (2.5 - endomethylene-cyclohexyl-methyl)-thio-urea melts at 184–186° C. after recrystallization from dioxan/methanol while decomposing.

(b) 11.8 grams of the thio-urea obtained under (a) are suspended in 100 ml. 2 N NaOH and 20 ml. of dioxane. 30 ml. of hydrogen peroxide of 35% strength are added and heated for 10 minutes on the steam bath. After cooling the whole is acidified by adding hydrochloric acid, the crystalline precipitate of N-[4-(β-<3-ethoxy-thiophene-2-carbonamido> - ethyl) - benzenesulfonyl] - N' - (2.5-endomethylene-cyclohexylmethyl)-urea obtained, is filtered with suction and recrystallized with dilute methanol. The substance melts at 164–165° C.

2(a) 4.9 grams of the thio-urea obtained under 1(a) are dissolved in 250 ml. of methanol. 2.2 grams of mercury oxide are added while stirring and heated for 4 hours to boil under reflux. After filtration of the mercury formed the whole is concentrated. The remaining residue of N-[4 - (β - <3 - ethoxy - thiophene - 2 - carbonamido>-ethyl) - benzenesulfonyl] - N' - (2.5 - endomethylenecyclohexyl-methyl)-isourea-methyl-ether melts after recrystallization from dilute methanol at 96°–98° C.

(b) 1 gram of the isourea ether obtained under 2(a) is dissolved in about 30 ml. of 2 N NaOH and 20 ml. of dioxane. Stirring is continued for 4 hours while heating simultaneously to 90° C. By acidification and dilution with water a crystalline mass of N-[4-(β-<3-ethoxy-thiophene-2 - carbonamido> - ethyl) - benzenesulfonyl] - N' - (2.5-

We claim:
1. A benzenesulfonyl-urea of the formula

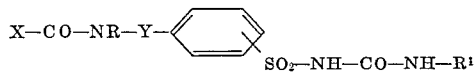

in which
R is hydrogen or lower alkyl; $R^1$ is
 (a) alky or alkenyl of 2 to 8 carbon atoms,
 (b) alkoxyalkyl or alkylmercaptoalkyl of 4 to 8 carbon atoms each, at least two carbon atoms forming the alkylene portion of the alkoxyalkyl or alkylmercaptoalkyl,
 (c) phenyl-lower alkyl,
 (d) cycloalkyl-lower alkyl having 7 to 9 carbon atoms of which 6 to 8 are in the cycloalkyl moiety,
 (e) endoalkylene - cyclohexyl, endoalkylene-cyclohexenyl, endoalkylene-cyclohexylmethyl or endoalkylene-cyclohexenylmethyl of 1 to 2 endoalkylene carbon atoms,
 (f) lower alkylcyclohexyl, lower alkoxycyclohexyl,
 (g) cycloalkyl of 5 to 8 carbon atoms,
 (h) cyclohexenyl, cyclohexenylmethyl, or
 (i) thienyl or oxacyclohexyl linked to the adjacent nitrogen atom directly or by —$CH_2$—;
X is
 (a) thienyl or thienoxy unsubstituted or substituted by one or two substituents selected from the group consisting of halogen, lower alkyl, lower alkoxy, lower alkenyloxy, lower alkoxy-lower alkoxy, phenyl-lower alkoxy and phenyl, or by a polymethylene chain of 3 to 4 carbon atoms linked at the ends to adjacent carbon atoms of the thiophenyl nucleus, or
 (b) furyl unsubstituted or substituted by one or two substituents selected from the group consisting of halogen and methyl, the thienyl, thienoxy or furyl groups being linked either directly or by means or methylene or a saturated or olefinically unsaturated hydrocarbon chain of two carbon atoms to the adjacent carbonyl groups; and
Y is a hydrocarbon chain of 1 to 4 carbon atoms, or a salt thereof.

2. A compound as claimed in claim 1 in which X is a thienyl-(2)-group substituted in the 3-position by lower alkoxy and in 5-position by halogen, R is hydrogen, Y is dimethylene in para position to the sulfonylurea group and $R^1$ is cyclohexyl, 4-methylcyclohexyl, 4-ethylcyclohexyl or n-butyl.

3. A compound as claimed in claim 1 in which X is a thienyl-(2)group substituted in the 3-position by methoxy, R is hydrogen, Y is dimethylene in para position to the sulfonyl-urea group and $R^1$ is 4-methylcyclohexyl.

4. A compound as claimed in claim 1 in which X is a thienyl-(2)group substituted in the 3-position by methoxy, R is hydrogen, Y is dimethylene in para position to the sulfonyl-urea group and $R^1$ is cyclohexyl.

5. A compound as claimed in claim 1 in which X is a thienyl-(2)-group substituted in the 3-position by ethoxy, R is hydrogen, Y is dimenthylene in para position to the sulfonyl-urea group and $R^1$ is 4-methylcyclohexyl.

6. Compound as claimed in claim 1 in which X is a thienyl-(2)-group substituted in the 3- and 5-positions by methyl, R is hydrogen, Y is dimethylene in para position to the sulfonylurea group and $R^1$ is 4-methylcyclohexyl.

7. A compound as claimed in claim 1 in which X is a thienyl-(2)-group substituted in the 3-position by methoxy and the 5-position by chlorine, R is hydrogen, Y is dimethylene in para position to the sulfonylurea group and $R^1$ is cyclohexyl.

8. A compound as claimed in claim 1 in which X is a thienyl-(2)-group substituted in the 3-position by methoxy and the 5-position by chlorine, R is hydrogen, Y is dimethylene in para position to the sulfonylurea group and $R^1$ is 4-methylcyclohexyl.

9. A compound as claimed in claim 1 in which X is a thienyl-(2)-group substituted in the 3-position by methoxy and the 5-position by bromine, R is hydrogen, Y is dimethylene in para position to the sulfonylurea group and $R^1$ is cyclohexyl.

10. A compound as claimed in claim 1 in which X is a thienyl-(2)-group substituted in the 3-position by methoxy and the 5-position by bromine, R is hydrogen, Y is dimethylene in para position to the sulfonylurea group and $R^1$ is 4-methyl-cyclohexyl.

11. A compound as claimed in claim 1 in which X is a thienyl-(2)-group substituted in the 3-position by methoxy, R is hydrogen, Y is dimethylene in para position to the sulfonylurea group and $R^1$ is 2,5-endomethylenecyclohexyl.

12. A compound as claimed in claim 1 in which X is a thienyl-(2)-group substituted in the 3-position by ethoxymethoxy, R is hydrogen, Y is dimethylene in para position to the sulfonylurea group and $R^1$ is 4-methylcyclohexyl.

13. A compound as claimed in claim 1 in which X is a furyl-(2)-group, R is hydrogen, Y is dimethylene in para position to the sulfonylurea group and $R^1$ is 4-methylcyclohexyl.

14. A compound as claimed in claim 1 in which X is a furyl-(2)-group substituted in the 5-position by chlorine, R is hydrogen, Y is dimethylene in para position to the sulfonylurea group and, $R^1$ is 4-methylcyclohexyl.

15. A compound as claimed in claim 1 in which X is a furyl-(2)-group, R is hydrogen, Y is dimethylene in para position to the sulfonylurea group and $R^1$ is 4-ethylcyclohexyl.

References Cited
UNITED STATES PATENTS

| | | | |
|---|---|---|---|
| 3,426,067 | 2/1969 | Weber et al. | 260—553 |
| 3,406,199 | 10/1968 | Weber et al. | 260—553 |
| 3,338,955 | 8/1967 | Aumuller et al. | 260—470 |

HENRY R. JILES, Primary Examiner

C. M. SHURKO, Assistant Examiner

UNITED STATES PATENT OFFICE
CERTIFICATE OF CORRECTION

Patent No. 3,494,936            Dated February 10, 1970

Inventor(s) Weyer, Aumuller and Weber

It is certified that error appears in the above-identified patent and that said Letters Patent are hereby corrected as shown below:

In the Heading:

After "Aug. 14, 1964, F 43,750" insert --; and Luxemburg, January 13, 1965, 47,778.--

Signed and sealed this 13th day of June 1972.

(SEAL)
Attest:

EDWARD M. FLETCHER, JR.
Attesting Officer

ROBERT GOTTSCHALK
Commissioner of Patents